(12) United States Patent
Ahn et al.

(10) Patent No.: US 7,359,022 B2
(45) Date of Patent: Apr. 15, 2008

(54) WIRE STRUCTURE OF DISPLAY DEVICE

(75) Inventors: Ji-Young Ahn, Kyungki-Do (KR); Gyo-Won Chin, Seoul (KR)

(73) Assignee: LG.Philips LCD Co., Ltd., Seoul (KR)

( * ) Notice: Subject to any disclaimer, the term of this patent is extended or adjusted under 35 U.S.C. 154(b) by 212 days.

(21) Appl. No.: 10/301,868

(22) Filed: Nov. 22, 2002

(65) Prior Publication Data

US 2004/0100434 A1    May 27, 2004

(51) Int. Cl.
*G02F 1/1343* (2006.01)
*G02F 1/136* (2006.01)
*H01L 31/00* (2006.01)

(52) U.S. Cl. .................... 349/139; 349/43; 257/59

(58) Field of Classification Search .................. 349/43, 349/139, 138, 42, 143; 257/59, 72
See application file for complete search history.

(56) References Cited

U.S. PATENT DOCUMENTS

| | | | | |
|---|---|---|---|---|
| 5,920,083 A * | 7/1999 | Bae | .............................. | 257/59 |
| 6,091,473 A * | 7/2000 | Hebiguchi | .................... | 349/43 |
| 6,469,769 B2 * | 10/2002 | Ozaki | ......................... | 349/187 |
| 6,486,933 B1 * | 11/2002 | Cha et al. | .................... | 349/139 |
| 6,628,357 B1 * | 9/2003 | Maeda et al. | ................ | 349/113 |
| 6,693,691 B2 * | 2/2004 | Sato et al. | ................... | 349/113 |
| 7,075,595 B2 * | 7/2006 | Moon | .......................... | 349/46 |
| 7,209,203 B2 * | 4/2007 | Son | ............................. | 349/139 |
| 2002/0044229 A1 * | 4/2002 | Kim | ............................ | 349/43 |
| 2002/0093600 A1 * | 7/2002 | Chol | ........................... | 349/43 |
| 2004/0174484 A1 * | 9/2004 | Matsumoto | ................. | 349/139 |

* cited by examiner

*Primary Examiner*—Toan Ton
(74) *Attorney, Agent, or Firm*—McKenna Long & Aldridge LLP

(57) ABSTRACT

A wire structure of a display device is disclosed. Undesirable short at upper wires can be repaired through the laser cutting while preventing a damage to the lower wires through the through hole provided at the lower wires of the region where the upper wires are mutually isolated.

19 Claims, 4 Drawing Sheets

WIRE STRUCTURE OF DISPLAY DEVICE

BACKGROUND OF THE INVENTION

1. Field of the Invention

The present invention relates to a wire structure of a display device and, more particularly, to a wire structure of a display device suitable for effectively isolating an upper wire through a laser cutting while preventing a damage to a lower wire in case that short occurs at the upper wires which are to be isolatedly patterned in a display device where more than 2 wires are stacked.

2. Discussion of the Related Art

In general, a liquid crystal display device is a display device that a data signal is individually supplied to liquid crystal cells arranged in a matrix form and light transmittance of the liquid crystal cells is controlled to display an image corresponding to the data signal.

Thus, the liquid crystal display device includes liquid crystal panel on which the liquid crystal cells in a pixel unit are arranged in a matrix form; and a driver integrated circuit (IC) for driving the liquid crystal cells.

At this time, in the liquid crystal panel, a common electrode is formed at one inner side of facing upper and lower substrates and a pixel electrode is formed at the other side of facing upper and lower substrate, which are then arranged to face each other. An electric field is applied to a liquid crystal layer formed between the upper and lower substrates through the common electrode and the pixel electrode. The pixel electrode is formed at each liquid crystal cell on the lower substrate while the common electrode is integrally formed at the entire surface of the upper substrate.

On the lower substrate of the liquid crystal panel, a plurality of data lines for transmitting a data signal supplied from a data driver integrated circuit to the liquid crystal cells and a plurality of gate lines for transmitting a scan signal supplied from a gate driver integrated circuit to the liquid crystal cells are formed in an intersecting direction. Liquid crystal cells are defined at every intersection of the data liens and the gate lines.

The gate driver integrated circuit sequentially supplies a scan signal to the plurality of gate lines so that the liquid crystal cells arranged in a matrix form can be sequentially selected one line by one line, and a data signal is supplied to the selected one line of liquid crystal cells from the data driver integrated circuit.

A thin film transistor used as a switching device is formed at each liquid crystal cell. As the scan signal is supplied to the gate electrode of the thin film transistor through the gate lines to the liquid crystal cells, a conductive channel is formed between the source electrode and the drain electrode of the thin film transistor. At this time, as the data signal supplied to the source electrode of the thin film transistor through the data lines is supplied to the pixel electrode by way of the drain electrode of the thin film transistor, a light transmittance of the corresponding liquid crystal cell is controlled.

FIG. 1 is a plan view of a general liquid crystal cell of a liquid crystal display device.

As shown in FIG. 1, a liquid crystal cell formed at the intersection of a data line 2 and a gate line 4 includes a thin film transistor (TFT) and a pixel electrode 14 connected to a drain electrode 12 of the thin film transistor (TFT). A source electrode 8 of the TFT is connected to the data line 2 and a gate electrode 10 is connected to the gate line 4.

The drain electrode 12 of the TFT is connected to the pixel electrode 14 through a drain contact hole 16, and the TFT includes an active layer (not shown) for forming a conductive channel between the source electrode 8 and the drain electrode 12 by the scan signal supplied to the gate electrode 10 through the gate line 4.

As the TFT forms a conductive channel between the source electrode 8 and the drain electrode 12 in response to the scan signal supplied from the gate line 4, the data signal supplied to the source electrode 8 through the data line 2 is transmitted to the drain electrode 12.

Meanwhile, the pixel electrode 14 connected to the drain electrode 12 through the drain contact hole 16 is formed wide at the region where liquid crystal is positioned at every liquid crystal cell, and made of a transparent ITO (indium tin oxide) with a high light transmittance.

The pixel electrode 14 generates an electric field to the liquid crystal layer together with the common transparent electrode (not shown) formed at the upper substrate by the data signal supplied from the drain electrode 12.

When the electric field is applied to the liquid crystal layer, liquid crystal is rotated by dielectric anisotropy and transmits light emitted from a backlight toward the upper substrate through the pixel electrode 14. The amount of transmitted light is controlled by a voltage value of the data signal.

Meanwhile, a storage electrode 20 connected to the pixel electrode 14 through a storage contact hole 22 is deposited on the gate line 4 to form a storage capacitor 18, and a gate insulation film (not shown) deposited during a process of forming the TFT is inserted between the storage electrode 20 and the gate line 4, so as to be isolated.

The storage capacitor 18 charges a voltage value of a scan signal during an interval that the scan signal is applied to the gate line 4 of the previous stage, and discharges the charged voltage during an interval that a scan signal is applied to a gate line 4 of the next stage and a voltage value of the data signal is supplied to the pixel electrode 14. In this manner, the storage capacitor 18 serves to minimize a voltage variation.

In the general liquid crystal display device, the pixel electrode 14 is formed isolated from the data line 2 formed isolatedly in a vertical direction in a pixel region, and if the mutually adjacent pixel electrodes are short, laser cutting is performed on the region where the data line 2 and the pixel electrode 14 are isolated to electrically isolate the pixel electrode 14.

FIG. 2 is a sectional view taken along line I-I' of FIG. 2.

A fabrication process of a general liquid crystal display device using 5 masks will now be described with reference to FIG. 2.

First, a metal material (Mo, Al or Cr, etc.) is deposited by sputtering on the lower substrate 1 and patterned through a first mask to form a gate electrode 10.

Next, an insulation material such as SiNx or the like is entirely deposited on the lower surface 1 with the gate electrode 10 formed thereon to form a gate insulation film 30.

And then, a semiconductor layer 32 made of amorphous silicon and ah ohmic contact layer 34 made of n+ amorphous silicon doped with high density phosphorus (P) are successively deposited on the gate insulation film 30 and patterned through a second mask to form an active layer 36 of the TFT.

Thereafter, a metal material is deposited on the gate insulation film 30 and the ohmic contact layer 34 and patterned through a third mask to form a source electrode 8 and a drain electrode 12 of the TFT. At this time, the ohmic contact layer 34 exposed between the source electrode 8 and the drain electrode 12 is removed during a patterning process.

A passivation layer 38 made of an SiNx material is entirely deposited through a chemical vapor deposition on the gate insulation film 30 with the source electrode 8 and the drain electrode formed thereon including the exposed semiconductor layer 32.

A portion of the passivation layer 38 on the drain electrode 12 is etched through a fourth mask to form a drain contact hole 16 exposing a portion of the drain electrode 12.

A transparent electrode material is deposited by sputtering on the passivation layer 38 and patterned through a fifth mask to form the pixel electrode 14. The pixel electrode 14 is formed to be connected to the drain electrode 12 through the drain contact hole 16.

FIG. 3 is a sectional view taken along line II-II' of FIG. 1.

An overlap relation between the data line 2 and the pixel electrode 14 will now be described with reference to FIG. 3.

First, in the process of forming the source electrode 8 and the drain electrode 12 of the TFT by patterning through the third mask, the data line 2 connected to the source electrode 8 is patterned to be regularly isolated.

And then, in the process that the passivation layer 38 made of an SiNx material is formed at the entire upper surface of the lower substrate 1 including the data line 2 and patterned through the fifth mask to form the pixel electrode 14, the pixel electrode 14 is patterned at the upper surface of the passivation layer 38 of the region where the data lines 2 are mutually isolated.

In the general liquid crystal display device, if the data line 2 and the pixel electrode 14 is extended to be overlapped by the passivation layer 38 in order to improve an aperture ratio, the inorganic substance such as SiNx or the like, a comparatively thin film as a passivation layer 38, is applied thereto, which causes a problem that signal characteristics are degraded due to parasitic capacitance of the data line and the pixel electrode 14.

Therefore, recently, an organic substance such as BCB (benzocyclobutene), SOG (spin on glass) or acryl or the like is applied as the passivation layer in fabricating a liquid crystal display device with an improved aperture ratio as well as preventing degradation of signal characteristics, since even if the data line 2 and the pixel electrode 14 are overlapped by the passivation layer, their parasitic capacitance is infinitesimal.

The liquid crystal display device with high aperture ratio will now be described in detail with reference to the accompanying drawings.

FIG. 4 is a plan view of liquid crystal cell of the general liquid crystal display device with a high aperture ratio.

As shown in FIG. 4, the liquid crystal is shown the same as that of FIG. 1 except that the pixel electrode 14 is formed overlapped with a partial marginal portion of the data line 2

The reason how the pixel electrode 14 can be formed overlapped with a portion of the marginal portion of the data line 2 is that the organic substance such as BCB, SOG or acryl or the like is formed at a thick film and applied as a passivation layer so that the parasitic capacitance of the data line 2 and the pixel electrode 14 can be minimized and thus degradation of signal characteristics can be prevented.

FIG. 5 is a sectional view taken along line III-III' of FIG. 4.

As shown in FIG. 5, the data lines 2 are patterned isolatedly and regularly at the upper surface of the lower substrate 1, and a thick passivation film 48 made of an organic substrate such as BCB, SOG or acryl or the like with a low dielectric constant is formed at the entire upper surface of the lower substrate 1 including the data line 2. And then, the pixel electrode is formed to be overlapped with a marginal portion of the data line 2 at the upper portion of the passivation layer 48 where the data lines 2 are mutually isolated.

Therefore, in such a liquid crystal display device with a high aperture ratio, if the mutually adjacent pixel electrodes 14 are short due to a residual according to patterning of conductive films, the laser cutting should be performed on the data line 2 to isolate the pixel electrodes 14.

In this respect, however, if the laser cutting is performed on the data line 2, not only does the data line 2, the lower wire, be damaged but also the data lines 2 are short. Thus, if such the short occurs at the pixel electrode 14, its product should be discarded, causing problems that the cost of materials is increased and yield is degraded, and thus, a unit cost of the product is increased.

SUMMARY OF THE INVENTION

Therefore, an object of the present invention is to provide a wire structure of a display device that is capable of isolating upper wire through laser cutting while preventing a damage to a lower wire if the upper wires to be isolatedly patterned are short in a display device in which more than two wires are overlapped with an insulation film therebetween.

To achieve these and other advantages and in accordance with the purpose of the present invention, as embodied and broadly described herein, there is provided a wire structure of a display device in which more than two wires are stacked with an insulation film therebetween, including: upper wires isolatedly patterned; lower wires patterned at the isolated region between the upper wires and having a through hole; and an insulation film insertedly formed between the upper wire and the lower wire The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE ILLUSTRATED EMBODIMENTS

Reference will now be made in detail to the preferred embodiments of the present invention, examples of which are illustrated in the accompanying drawings.

Figure 1:
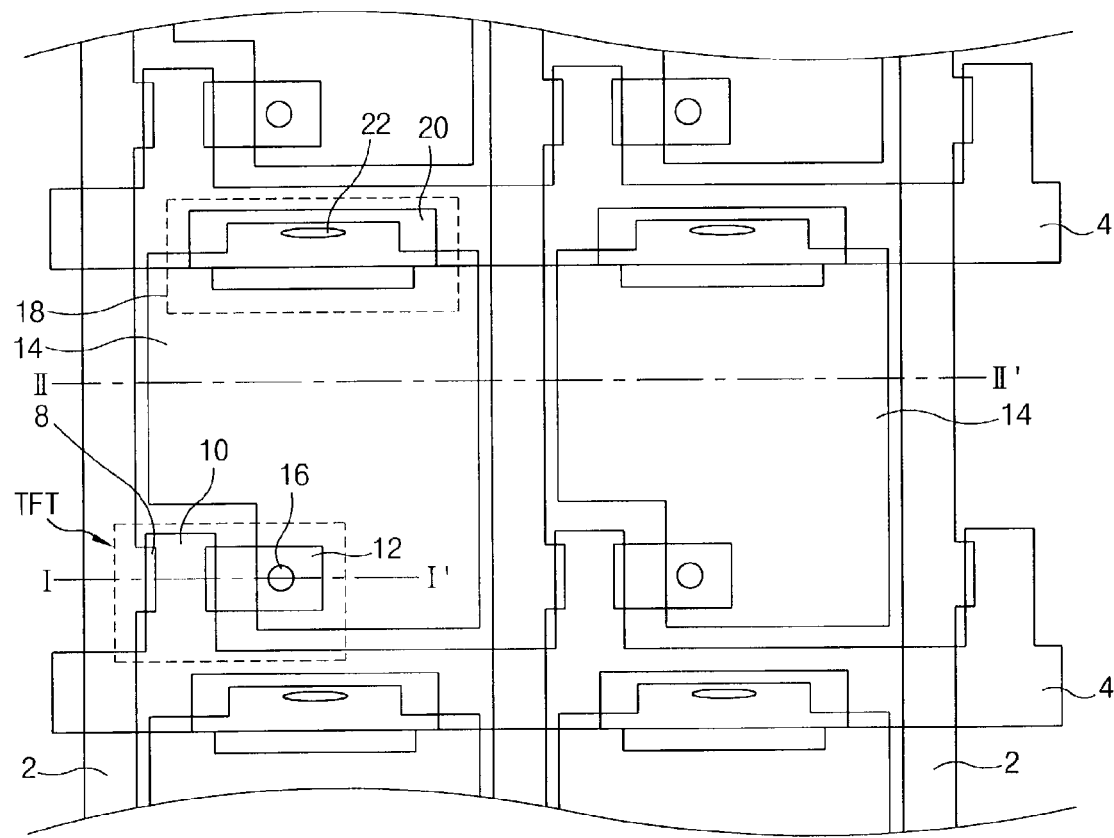
FIG. 1 is a plan view of a general liquid crystal cell of a liquid display device.
Figure 2:
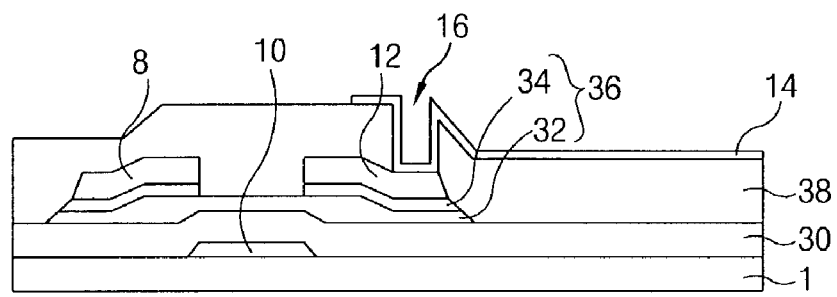
FIG. 2 is a sectional view cut along line I-I' of FIG. 1.
Figure 3:
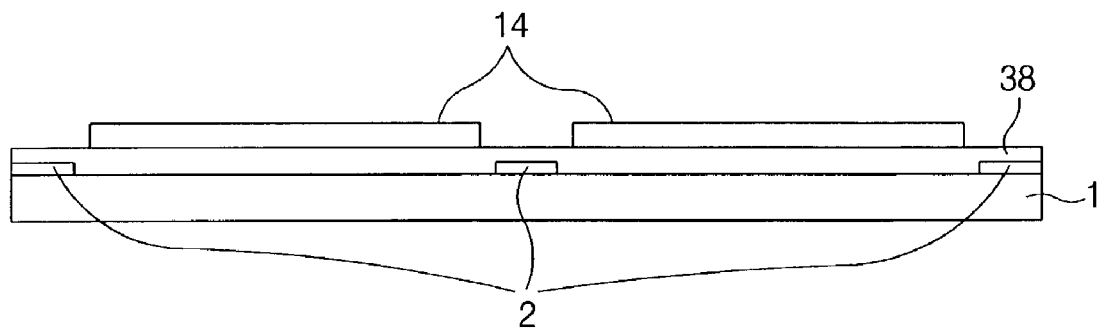
FIG. 3 is a sectional view cut along line II-II' of FIG. 1.
Figure 4:
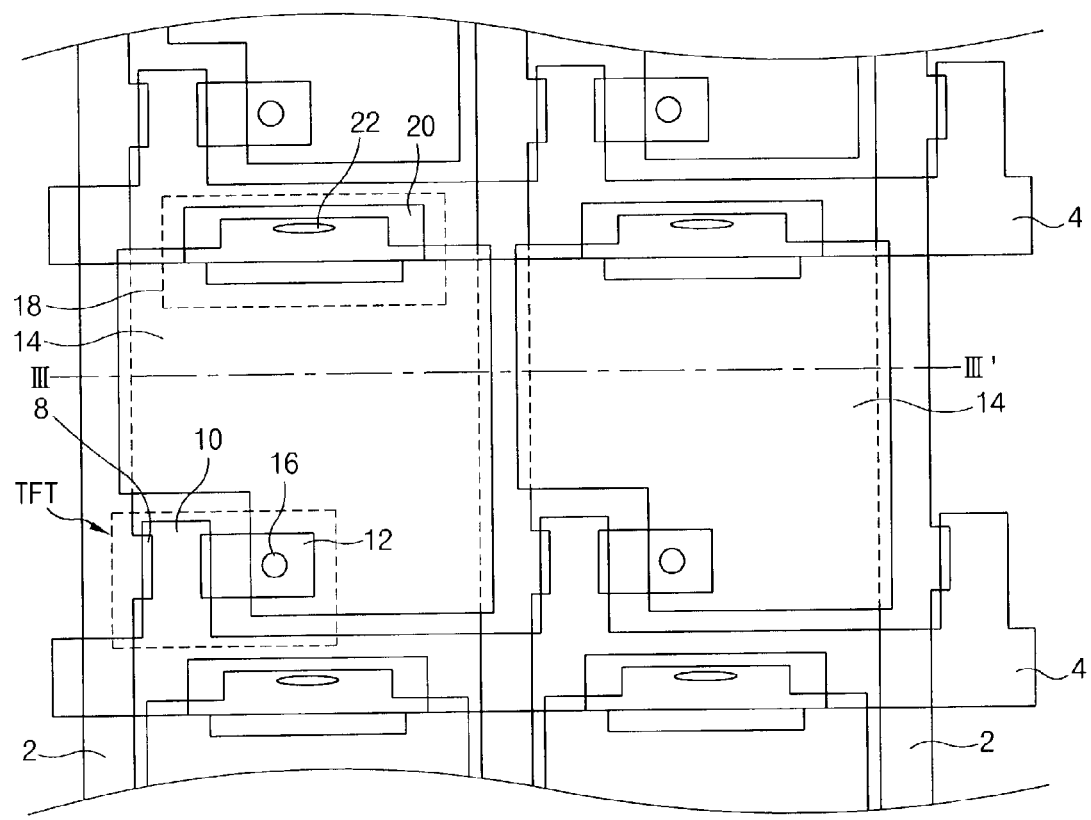
FIG. 4 is a plan view of a liquid crystal cell of a general liquid crystal display device with a high aperture ratio.
Figure 5:
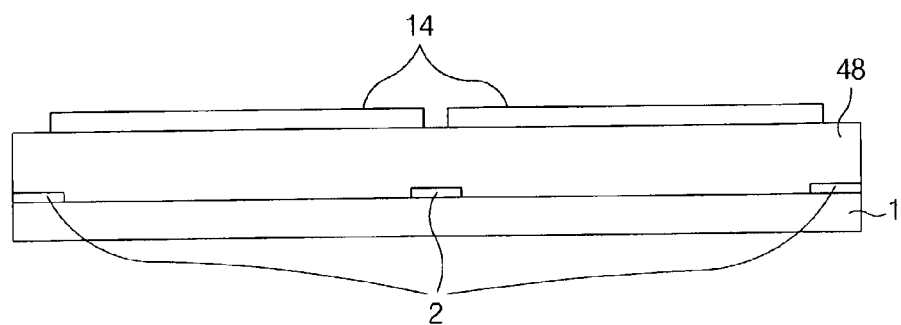
FIG. 5 is a sectional view cut along line III-III [of FIG. 4.
Figure 6:
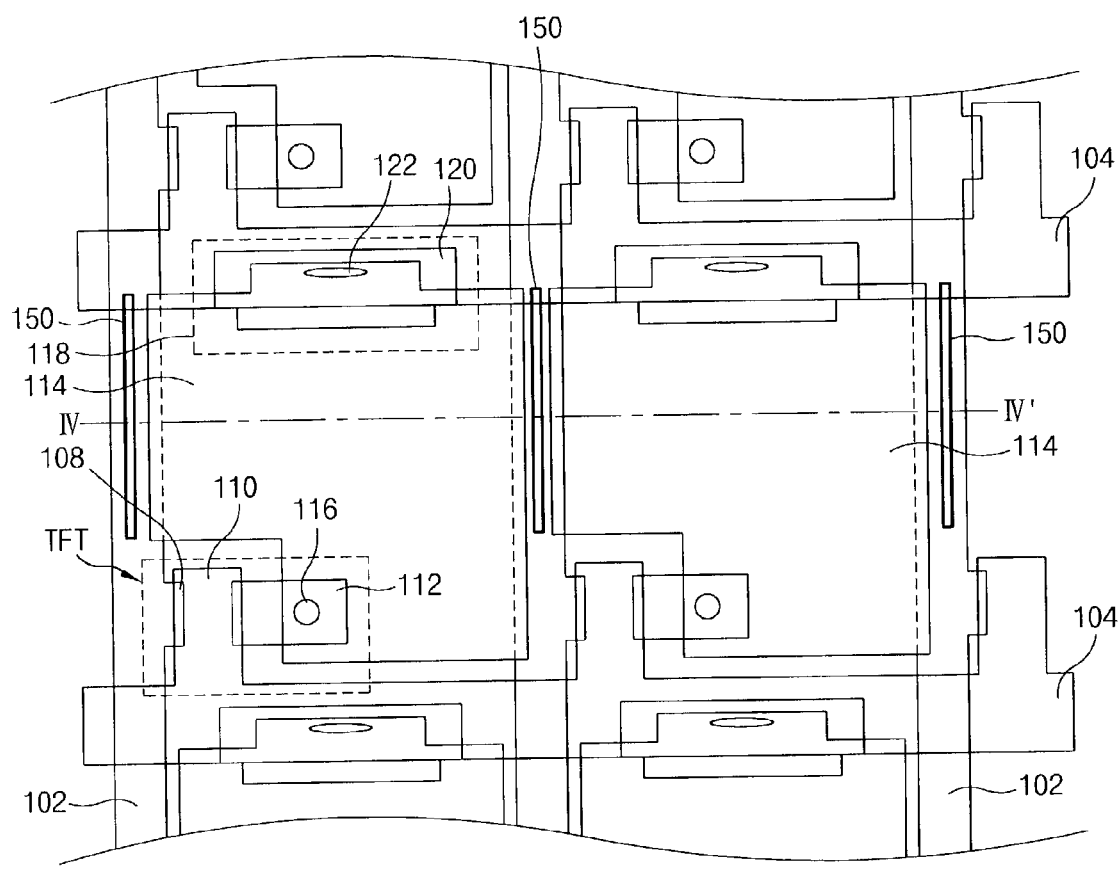
FIG. 6 is a plan view of a liquid crystal display device with a high aperture ratio in accordance with a preferred embodiment of the present invention.

FIG. 6 is a plan view of a liquid crystal display device with a high aperture ratio in accordance with a preferred embodiment of the present invention.

As shown in FIG. 6, a liquid crystal cell formed at an intersection of a data line 102 and a gate line 104 includes a thin film transistor (TFT) and a pixel electrode 114 connected to a drain electrode 112 of the TFT. A source electrode of the TFT is connected to the data line 102 and a gate electrode thereof is connected to the gate line 104.

The drain electrode 112 of the TFT is connected to the pixel electrode 114 through a drain contact hole 116, and a conductive channel is formed between the source electrode 108 and the drain electrode of the TFT by a scan signal supplied to the gate electrode 110 through the gate line 104.

As the TFT forms the conductive channel between the source electrode 108 and the drain electrode 112 in response to the scan signal supplied from the gate line 104, a data signal supplied to the source electrode 108 through the data line 102 is transmitted to the drain electrode 112.

Meanwhile, the pixel electrode connected to the drain electrode 112 through the drain contact hole 116 is formed wide at the region where the liquid crystal is positioned in every liquid crystal cell, and is made of transparent ITO material with a high light transmittance.

At this time, the pixel electrode 114 generates an electric field at the liquid crystal layer together with a common transparent electrode (not shown) formed at the upper substrate by the data signal supplied from the drain electrode 112.

When the electric field is applied to the liquid crystal layer, the liquid crystal is rotated by the dielectric anisotropy and transmits light emitted from the backlight toward the upper substrate through the pixel electrode 114, and the amount of transmitted light is controlled by a voltage value of the data signal.

Meanwhile, a storage electrode 120 connected to the pixel electrode 114 through a storage contact hole 122 is deposited on the gate line 104 to form a storage capacitor 118, and the storage electrode 120 and the gate line 104 are overlapped with a gate insulation film (not shown) deposited during a process of forming the TFT therebetween.

The storage capacitor 118 charges a voltage value of a scan signal during an interval that the scan signal is applied to the gate line 104 of the previous stage, and discharges the charged voltage during an interval that a scan signal is applied to the gate line 104 of the next stage and a voltage value of the data signal is supplied to the pixel electrode 114. In this manner, the storage capacitor 118 serves to minimize a voltage variation.

In the liquid crystal display device with a high aperture ratio in accordance with the preferred embodiment of the present invention, since the pixel electrode 114 is extended to be overlapped with a portion of the marginal portion of the left and right data liens 102 and patterned, the pixel electrodes 114 of the mutually adjacent liquid crystal cells are isolated on the data line 102 and the data line 102 is patterned to have a through hole 150 at the region where the pixel electrodes 114 are mutually isolated.

The reason how the pixel electrode 114 can be formed overlapped with a portion of the marginal portion of the data line 2 is that the organic substance such as BCB, SOG or acryl or the like is formed at a thick film and applied as a passivation layer so that the parasitic capacitance of the data line 102 and the pixel electrode 114 can be minimized and thus degradation of signal characteristics can be prevented.

Figure 7:
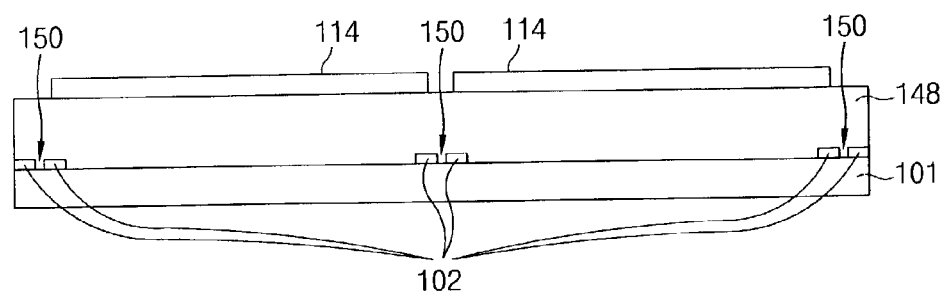
FIG. 7 is a sectional view cut along line IV-IV' of FIG. 6.

FIG. 7 is a sectional view cut along line IV-IV' of FIG. 6.

As shown in FIG. 6, the data lines 102 are patterned isolatedly and regularly at the upper surface of the lower substrate 101, and a thick passivation film 148 made of an organic substrate such as BCB, SOG or acryl or the like with a low dielectric constant is formed at the entire upper surface of the lower substrate 101 including the data line 102. And then, the pixel electrode 114 is formed to be overlapped with a marginal portion of the data line 102 at the upper portion of the passivation layer 148 where the data lines 102 are mutually isolated.

The data line 102 is patterned to have a through hole 150 at the region where the pixel electrodes 114 are isolated which will be formed through a follow-up process.

Thus, if the mutually adjacent pixel electrodes 114 are short, a laser cutting is performed at the region of the through hole 150 provided in the data line 112 to isolate the adjacent pixel electrodes 114, and thus, a damage to the data line 114 can be prevented.

The above descriptions are made limited to the wire structure of the liquid crystal display device with a high aperture ratio, but a person in the art to which the present invention pertains would easily apply the technical gist of the present invention for preventing a damage to the lower wires in performing the laser cutting to repair an undesirable short at the upper wires to various display devices.

As so far described, the wire structure of a display device in accordance with the present invention has the following advantages.

That is, the undesirable short at the upper wires can be repaired through the laser cutting while preventing a damage to the lower wires through the through hole provided at the lower wires of the region where the upper wires are mutually isolated. Thus, the yield is improved and a product favorable in view of a cost competitiveness can be fabricated.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. A wire structure of a display device having a plurality of pixels in which more than two wires are stacked with an insulation film therebetween, comprising:
    upper wires formed in substantially whole area of the pixel such that they are isolated from other upper wires formed in other pixel;
    lower wires patterned at a region between the upper wires, the lower wires being patterned to have a through hole disposed in the regions between the upper wires neighboring along the elongation direction of a data line of a liquid crystal display device; and
    an insulation film formed between the upper wires and the lower wires,
    wherein the lower wire is a data line of a liquid crystal display device.

2. The wire structure of claim 1, wherein the upper wire is a pixel electrode of a liquid crystal display device.

3. The wire structure of claim 2, wherein the pixel electrode is made of a transparent conductive material.

4. The wire structure of claim 2, wherein the pixel electrode is made of an ITO material.

5. The wire structure of claim 1, wherein the data line is made of a translucent conductive material.

6. The wire structure of claim 1, wherein the insulation film is made of an organic substance of one selected from the group consisting of BCB, SOG and acryl.

7. A wire structure of a display device having a plurality of pixels, comprising:
- a plurality of first wire patterns in substantially whole area of the pixel;
- a second wire pattern patterned to form a hole; and
- an insulating layer between the first wire patterns and the second wire pattern,
- wherein the hole is disposed at a portion between adjacent first wire patterns along the elongation direction of a data line of a liquid crystal display device and
- wherein the second wire pattern is a data line of a liquid crystal display device.

8. The wire structure of claim 7, wherein when a short occurs between the first wire patterns, a laser beam is irradiated to a shorted portion of the first wire patterns through the hole to separate the shorted first wire patterns.

9. A liquid crystal display device, comprising:
- a substrate;
- a plurality of gate lines and data lines to define a plurality of pixels on the substrate, each data line including at least one hole;
- a thin film transistor at each pixel;
- a passivation layer over the substrate; and
- pixel electrodes on the passivation layer respectively in substantially whole area of the plurality of pixels,
- wherein the at least one hole is disposed along a portion between the adjacent pixel electrodes in the elongation direction of a data line of a liquid crystal display device.

10. The liquid crystal display device of claim 9, wherein the thin film transistor includes:
- a gate electrode on the substrate;
- a gate insulating layer on the gate electrode;
- a semiconductor layer on the gate insulating layer; and
- a source electrode and a drain electrode on the semiconductor layer.

11. The liquid crystal display device of claim 9, wherein the pixel electrode is made of a transparent conductive material.

12. The liquid crystal display device of claim 11, wherein the pixel electrode is made of an Indium Tin Oxide.

13. The liquid crystal display device of claim 9, wherein the passivation layer is made of an organic substance.

14. The liquid crystal display device of claim 13, wherein the passivation layer is made of substance selected from the group consisting of BCB, SOG and acryl.

15. The liquid crystal display device of claim 13, wherein the data line is partially overlapped with the pixel electrode.

16. The liquid crystal display device of claim 9, wherein if adjacent pixel electrodes include a shorted portion, the shorted portion is separated by a laser-cutting through the hole.

17. A wire structure of a display device having a plurality of pixels in which more than two wires are stacked with an insulation film therebetween, comprising:
- upper wires formed in substantially whole area of the pixel such that they are isolated from other upper wires formed in the other pixel;
- lower wires patterned at a region between the upper wires, the lower wires being patterned to have a through hole disposed in the region between the upper wires neighboring along the elongation direction of a data line of a liquid crystal display device; and
- an insulation film having a low dielectric constant formed between the upper wires and the lower wires, wherein the lower wire is a data line of a liquid crystal display device.

18. A liquid crystal display device, comprising:
- a substrate;
- a plurality of gate lines and data lines to define a plurality of pixels on the substrate;
- a thin film transistor at each pixel;
- a passivation layer over the substrate;
- pixel electrodes on the passivation layer respectively in the pixels; and
- a plurality of open regions in the data line between the neighboring pixels,
- wherein the open regions are laser cutting regions where a laser beam is irradiated when the neighboring pixels are short.

19. The liquid crystal display device of claim 18, wherein the neighboring pixels are partially overlapped with the data line.

* * * * *